US Patent [19]  
Peterson

[11] 4,420,962  
[45] Dec. 20, 1983

[54] METHOD OF COLD COINING A TOOTHED SEGMENT FOR AN ENDLESS TRACK WHEEL AND TWO-PIECE DIE THEREFOR AND ARTICLE FORMED THEREBY

[75] Inventor: Donald J. Peterson, Racine, Wis.
[73] Assignee: Walker Forge, Inc., Racine, Wis.
[21] Appl. No.: 298,451
[22] Filed: Sep. 2, 1981
[51] Int. Cl.³ .............................................. B21D 22/00
[52] U.S. Cl. ..................................... 72/360; 72/356; 72/414; 72/375; 74/448; 29/159.2
[58] Field of Search ................ 72/356, 360, 412, 414, 72/416, 375, 376; 29/159 R, 159.2; 74/448

[56] References Cited  
U.S. PATENT DOCUMENTS

| | | | |
|---|---|---|---|
| 600,994 | 3/1898 | See | 29/159.2 |
| 1,305,050 | 5/1919 | Beall | 29/159.2 |
| 2,778,064 | 1/1957 | Clark | 18/59.3 |
| 3,287,797 | 11/1966 | Wilcox et al. | 29/159.3 |
| 3,439,551 | 4/1969 | Militana | 74/448 |
| 3,472,090 | 10/1969 | Dawe | 74/448 |
| 3,478,565 | 11/1969 | Schenk et al. | 72/399 |
| 3,908,430 | 9/1975 | Orain | 72/353 |
| 4,207,762 | 6/1980 | Kelly, Jr. | 72/360 |

Primary Examiner—Francis S. Husar  
Assistant Examiner—David B. Jones  
Attorney, Agent, or Firm—James E. Nilles

[57] ABSTRACT

A method of forging an arcuate shaped toothed segment which is adapted to be bolted to an endless track wheel for an endless track vehicle. The method includes the simultaneous finishing without the necessity of machining of various surfaces of the toothed segment, and which surfaces are arranged at right angles to one another. The method includes inserting a rough blank so that the surfaces to be finished are held in a two-piece die and at an inclined angle in respect to the direction of die movement. As a result, all of the surfaces of the segment are simultaneously and completely finished so as to need no further machining. A two-piece coin die assembly for the coining and finishing without machining of various surfaces of a toothed segment for an endless track wheel, wherein the surfaces, which are at right angles to one another are positioned at an inclined angle on the die in respect to the direction of die movement so as to simultaneously finish all of the surfaces and eliminate the necessity for machining. The die assembly also includes an adjustable coin button in one of the dies for accurately finishing and locating one of the surfaces and from which all of the other finished surfaces are to be held within specific and very close tolerances.

An arcuate shaped tooth segment for an endless track wheel having various surfaces arranged at right angles to one another and which are formed and finished completely and accurately by the above method and die assembly.

22 Claims, 6 Drawing Figures

METHOD OF COLD COINING A TOOTHED SEGMENT FOR AN ENDLESS TRACK WHEEL AND TWO-PIECE DIE THEREFOR AND ARTICLE FORMED THEREBY

BACKGROUND OF THE INVENTION

Various prior art methods and apparatus have been proposed for forging and/or cold coining various intricate parts. Examples of such prior art are shown in U.S. Pat. No. 2,778,064 issued Jan. 22, 1957 entitled "Coin Method and Apparatus". In that patent the method consisted of coining a powdered metal. Another example is shown in the U.S. Pat. No. 3,287,797 issued Nov. 29, 1966 entitled "Method of Making a Flanged Hub by Casting and Coining". Still other examples of prior art methods and apparatus are shown in the U.S. Pat. Nos. 4,207,762 issued June 17, 1980 entitled "Method of Forming High Quality Forgings"; 3,908,430 issued Sept. 30, 1975 entitled "Apparatus for Cold Forming Metal Workpieces"; and 3,478,565 issued Nov. 18, 1969 entitled "Forging Machine". These prior art devices generally involved very complicated apparatus including numerous parts and dies for simultaneously finishing various recesses or surfaces of the workpiece. Some of these and other prior art devices where capable only of finishing opposed surfaces.

SUMMARY OF THE PRESENT INVENTION

The present invention provides a method for manufacturing and finishing without the necessity of machining of the various surfaces of a toothed segment for an endless track wheel. The various surfaces to be completely finished are arranged generally at right angles to one another and the method is capable of simultaneously and completely finishing all of these surfaces. The method includes inserting a rough blank which has been formed generally to the same size and shape of the finished segment to be produced, in an open two-piece die that closes along one direction and positioning the blank in the die so that the surfaces to be finished are at an inclined angle to that direction. Closing of the die creates the necessary components of force in both vertical and horizontal directions on the surfaces to thereby accurately finish all of the surfaces simultaneously and accurately locate all of the surfaces relative to one another within the required tolerances. The surfaces to be finished include a gear tooth profile surface which is arranged at right angles to the side surfaces of the driving tooth portion of the segment. The segment which is arcuately shaped also has a radially inwardly extending mounting flange with opposite sides. At least a portion of one of these sides must be accurately finished to provide a proper bearing surface for bolt heads by means of which the segment is secured to the endless track wheel. These finished surfaces for the bolt heads form a reference point for the other surfaces to be finished on the segment and the location of which must be held to very close tolerances with respect to one another.

Another aspect of the invention relates to a two-piece coin die assembly for the coining of a rough forged blank and finishing it without machining of various surfaces of a toothed segment for an endless track wheel. The finishing surfaces of the die are arranged generally at right angles to one another and at an inclined angle in respect to the direction of die opening and closing movement. The die assembly includes an upper member which has at least one adjustable coin button rigidly secured therein for finishing engagement with one of the surfaces of the toothed segment to be finished in the die assembly, and this coin button accurately locates a critical surface of the finished workpiece with respect to the other surfaces of the workpiece.

Another aspect of the invention relates to providing an arcuately shaped toothed segment for an endless track wheel and which has been formed and completely finished by the cold forming method and die assembly of the present invention.

These and other objects and advantages of the present invention will appear hereinafter as this disclosure progresses, reference being had to the accompanying drawings.

DESCRIPTION OF A PREFERRED EMBODIMENT

Figure 1:
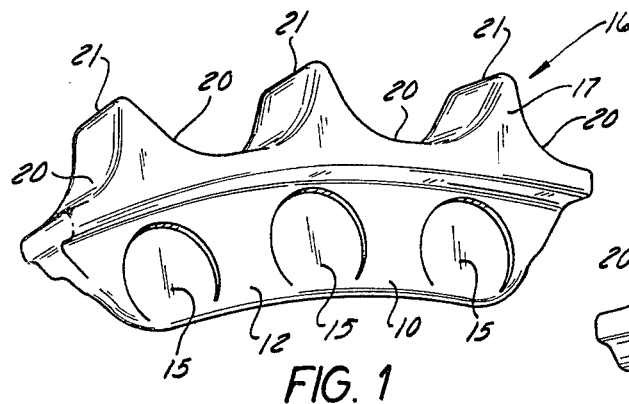
FIG. 1 is a perspective view of a finished arcuately shaped tooth segment for an endless track wheel provided by the present invention.
Figure 2:
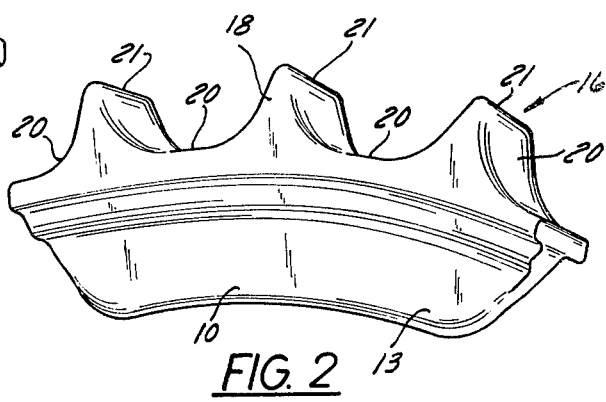
FIG. 2 is another perspective view of the segment shown in FIG. 1, but taken from the opposite side thereof.
Figure 3:
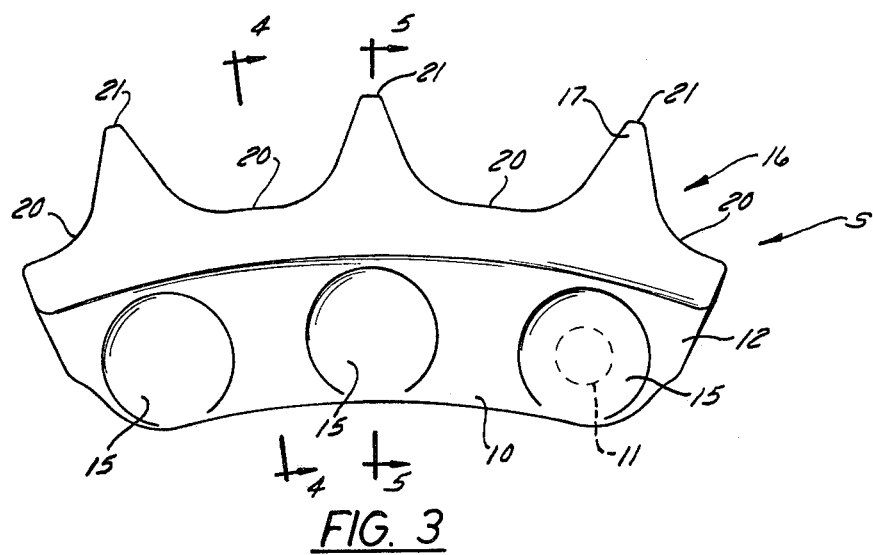
FIG. 3 is a vertical, elevational view of the segment shown in FIG. 1.
Figure 4:
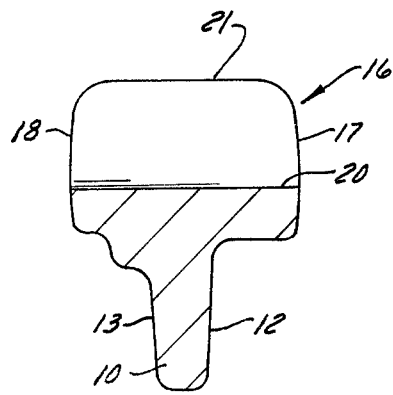
FIG. 4 is a transverse, sectional view taken generally along the line 4—4 in FIG. 3, but before the coining operation.
Figure 5:
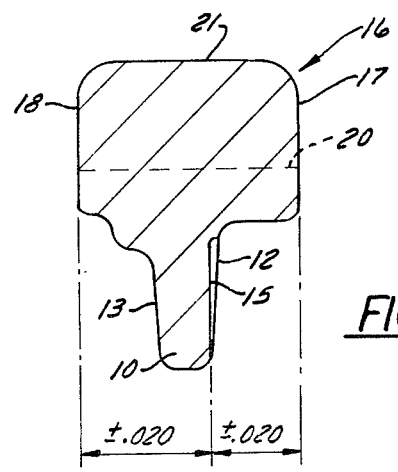
FIG. 5 is a transverse, sectional view taken generally along the line 5—5 in FIG. 6, and after the coining operation.

The arcuate shaped, toothed segment S made by the present invention is shown in FIGS. 1 to 5 and is one of several such segments which are bolted along the periphery of an endless track wheel for use in a track laying vehicle. The segment S may originally be formed in a number of ways, either by casting or a hot forging operation. It has been found for this particular part, that a hot forging operating is particularly suitable for first forming the rough blank. The rough blank is of the approximate size and shape of the segment when it is finished. These segments have heretofore been forged and then it was necessary to subsequently machine the various surfaces of the segment in order to completely finish it. These segments must be accurately finished and particularly the various surfaces of the segment must be accurately located with respect to one another so as to insure an accurate assembly of the segments on the track wheel. The segment is of generally arcuate shape and has a radially inwardly extending mounting flange 10 by means of which it is bolted to the track wheel by bolts 11 indicated by the dotted line in FIG. 3 which extend through holes drilled through the flange. The mounting flange has opposite sides 12 and 13 and one of these sides must be finished, at least in part, so as to form an accurately located and smoothly finished surface for the underside of the bolt heads. Heretofore these finished surfaces on one side of the flange were formed by a press while the piece was hot to thereby form bosses which were used as a reference point for marking the tooth profile 20. In the present invention, however, as shown in FIGS. 3 and 5, these finished surfaces on the side flange are formed as circular surfaces 15 and which are formed by the apparatus and method to be described. The arcuate segments also have an outer driving toothed portion 16 which extends as shown in FIGS. 4 and 5 laterally beyond either of the flange opposite sides 12 and 13. The driving toothed portion 16 also has opposite sides 17 and 18 and a gear tooth profile surface 20 is located between the two sides 17 and 18 and define the gear teeth 21. Thus the arcuately shaped segment has a finished surface 15 on at least a part of one of the sides of the flange 10 and this surface 15 must be maintained within a tolerance of 0.020 of an inch from the side surfaces 16 and 18 as indicated in FIG. 5. The transverse surface 20, that is the gear tooth profile surface 20, is arranged at right angles to the side surfaces 17 and 18 and this profile surface must be maintained square in relationship to surface 15 within 0.010 of an inch and the true profile of surface 20 must be held within 0.030 of an inch and such is accomplished by the present invention. Heretofore in order to hold the relationship of the surfaces as above indicated, it was necessary to provide machining of the surfaces after the segment was formed from forging.

The two piece coin die assembly for the coining and finishing without machining of the various surfaces described above is shown in FIG. 6. The die assembly includes an upper die 30 and a lower die 31 which are moved relative to one another in the direction indicated by the double-ended arrow 32. The dies 30 and 31 are suitably mounted in frames 34 and 35, respectively, the die 31 in the embodiment shown being stationary while the frame member 34 is reciprocably mounted towards and away from the lower die so as to close and open the die assembly, respectively. Conventional sliding guide posts 36 and bushings 37 are provided between the frames 34 and 35 in the known manner. Means are provided for providing a force in the coining press in the known manner, for example, on the order of 2,000 tons and as this is conventional, further description of the press is not believed to be necessary.

Figure 6:
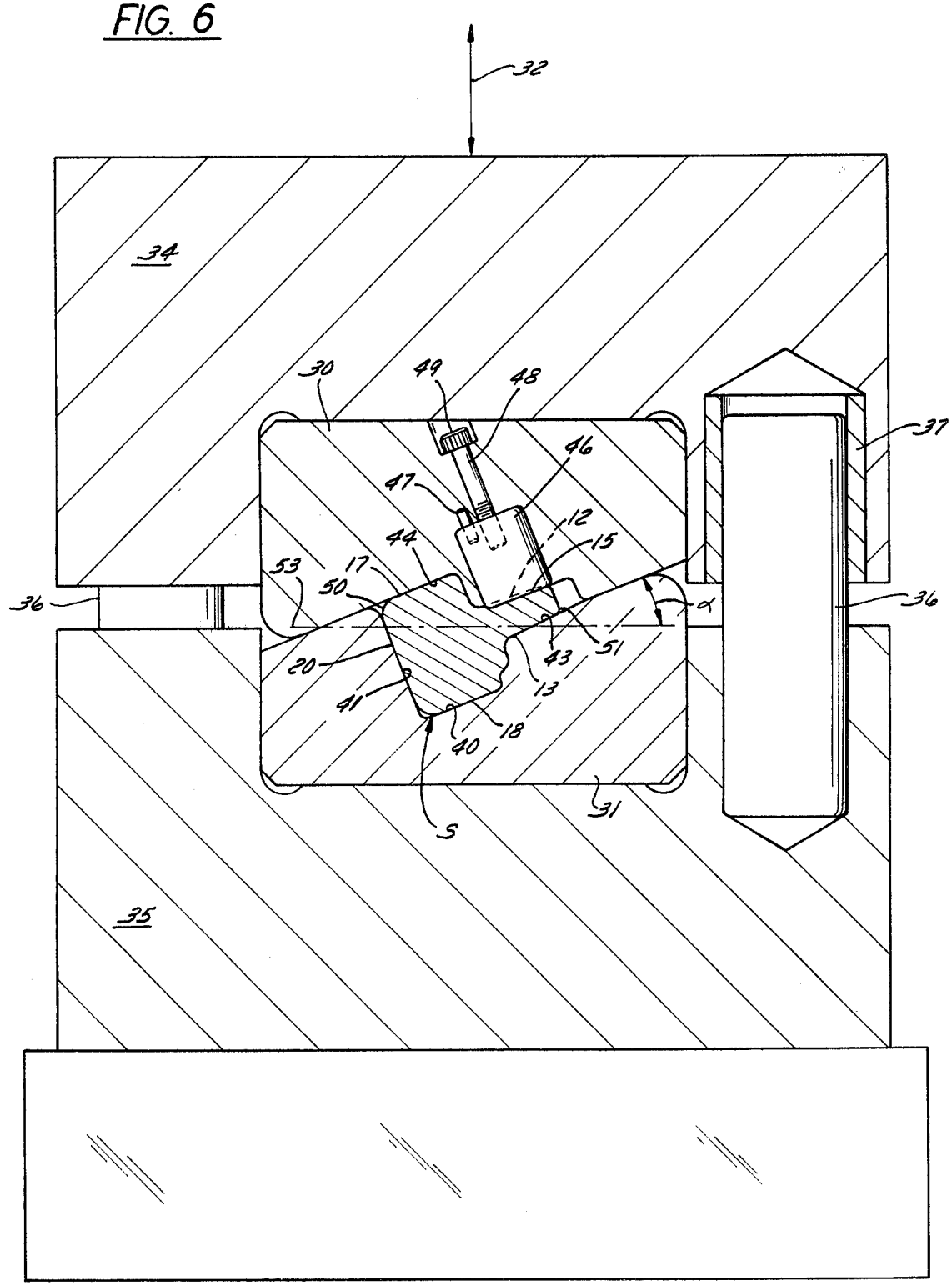
FIG. 6 is a cross sectional view through a two-piece die made in accordance with the present invention and showing the segment of FIGS. 1-5 located therein, the die being shown in the closed position as when it has completed its power stroke to finish the segment.

The assembly shown in FIG. 6 is closed, but when it is open, the upper die has moved upwardly so as to expose the die cavity and then the open lower die supportingly receives the segment S. The lower die has a supporting and finishing surface 40 for the side 18 of the driving toothed portion. The die also has a supporting and finishing surface 41 for the gear tooth profile surface 20. The die furthermore has a supporting surface 43 for the side 13 of the flange 10. It will be noted that the surface 13 however does not require a final finishing operation while the surface 18 and 20 do require a final finishing. The upper die has a finishing surface 44 engageable with the other side 17 of the driving toothed portion. The upper die furthermore has a plurality of adjustable coining buttons 46 rigidly mounted therein and held against rotation by a fixed pin 47. A threaded adjustable cap screw 48 threadably engages each of the buttons so that its head 49 can be turned to adjust the position of the buttons, that is adjust the depth to which the circular surfaces 15 are formed in the flange 10. In this manner the upper die acts to form and finish the surfaces 17 and 15 when the die is closed under pressure.

Generally it should be noted that the segment is tilted or positioned at an angle to the horizontal within the die. In other words, the finishing surfaces of the die and the corresponding surfaces to be finished on the segment are arranged at an inclined angle to the direction of movement 32 of the dies relative to one another. As a result there are both horizontal and vertical components of force applied to the segment and more specifically to its surfaces to be finished and which are arranged at 90 degrees to one another. With a single stroke of the die, all of the surfaces are simultaneously, completely and accurately finished. Furthermore, these surfaces are all held to the above described tolerances with respect to one another. The bolt head mounting surface 15 is an important one and can be adjusted to a precise location and finish; the other surfaces are held to the above mentioned tolerances in relation to the surface 15.

The angle $\alpha$ shown in FIG. 6 is about 21 degrees, thus making the inclined angle between the dies on the order of about 69 degrees from a vertical line. These angles will vary somewhat depending on the size of the segment being made. In other words, the inclined angle of the surface 15 on one side of the flange is about 69 degrees from the direction of die movement 32.

Referring to FIG. 6, it will be noted that the die assembly is such that the diagonal opposite corners 50 and 51 of the die assembly cavity both lie in a horizontal plane 53 which results in a very satisfactory die that is capable of being readily designed and manufactured.

RECAPITULATION

The present invention provides a method of manufacuturing and finishing a particularly shaped segment that has finished surfaces which are arranged at right angles to one another and must be accurately located with respect to one another. In addition to the novel method the invention provides a two-piece coin die assembly which permits all of the surfaces to be simultaneously, accurately and completely finished and also located with respect to one another, the primary reference surface on the flange being accurately adjusted and located. The die assembly holds the segment so that its right angle surfaces are held at an inclined angle in respect to the direction in which the dies move relative to one another. In this manner, both horizontal and vertical forces of the press are applied simultaneously to all relevant surfaces of the segment. The resulting arcuately shaped toothed segment is formed completely and to finished dimensions by a single cold coining operation, the finish and relative location of the various surfaces of the particularly shaped segment are held within extremely close tolerances.

I claim:

1. A method of manufacturing and finishing without machining of various surfaces of a toothed segment for an endless track wheel and wherein said surfaces are arranged generally at right angles to one another, the method comprising inserting a rough blank in an open two piece die that closes along one direction and positioning said blank in said die so that said surfaces are at an inclined angle to said direction, closing said die whereby said die creates forces simultaneously on all of said surfaces to accurately finish said surfaces and accurately locate them relative to one another, wherein said segment is arcuate in shape and has a radially inwardly extending, central mounting flange with opposite sides, said segment also has an outer driving tooth portion extending laterally beyond either of said flange opposite sides, said portion having opposite sides and a gear tooth profile surface formed between its sides and at an angle of about ninety degrees with respect thereto, said surfaces to be finished including (1) at least a part of one side of said flange, (2) said opposite sides of said driving tooth portion and (3) said gear tooth profile surface.

2. The method set forth in claim 1 further characterized in that said inclined angle of said part of one side of said flange being about 69 degrees from said direction of die movement.

3. The method set forth in claim 1 including holding the squareness of said gear tooth profile surface in relation to the surface of said part of said flange to within 0.010 of an inch.

4. The method set forth in claim 1 including holding the true location of the opposite sides of said driving tooth portion from the surface of said part of said flange to within 0.020 of an inch.

5. The method set forth in claim 2 including holding the true location of the opposite sides of said driving tooth portion from the surface of said part of said flange to within 0.020 of an inch.

6. The method set forth in claim 3 including holding the true location of the opposite sides of said driving tooth portion from the surface of said part of said flange to within 0.020 of an inch.

7. The method set forth in claim 1 including holding the true profile of said gear tooth profile surface to within 0.030 of an inch.

8. The method set forth in claim 2 including holding the true profile of said gear tooth profile surface to within 0.030 of an inch.

9. The method set forth in claim 3 including holding the true profile of said gear tooth profile surface to within 0.030 of an inch.

10. The method set forth in claim 4 including holding the true profile of said gear tooth profile surface to within 0.030 of an inch.

11. A method of forming and finishing an endless track wheel toothed segment having surfaces to be finished and which are arranged generally at right angles to one another, said method providing the final finishing of said surfaces without the necessity of machining said surfaces, the method comprising the steps of forming a blank by hot forging to the approximate size and shape of said finished segment, said blank being arcuate in shape and having a radially inwardly extending, central mounting flange with opposite sides, said segment also having an outer driving tooth portion extending laterally beyond either of said flange opposite sides, said driving tooth portion having opposite sides and a gear tooth profile surface formed between its sides, said surfaces to be finished including (1) at least a part of one side of said flange, (2) said opposite sides of said driving tooth portion and (3) said gear tooth profile surface,
inserting said blank in an open two-piece die that closes along one direction and positioning said blank in said die so that said surfaces are at an inclined angle to said direction, closing said die whereby said die creates forces simultaneously on all of said surfaces to accurately finish said surfaces and locate them relative to one another.

12. The method set forth in claim 11 further characterized in that said inclined angle of said part of one side of said flange being about 69 degrees from said direction of die movement.

13. The method set forth in claim 11 including holding the squareness of said gear tooth profile surface in relation to the surface of said part of said flange to within 0.010 of an inch.

14. The method set forth in claim 11 including holding the true location of the opposite sides of said driving tooth portion from the surface of said part of said flange to within 0.020 of an inch.

15. The method set forth in claim 12 including holding the true location of the opposite sides of said driving tooth portion from the surface of said part of said flange to within 0.020 of an inch.

16. The method set forth in claim 13 including holding the true location of the opposite sides of said driving tooth portion from the surface of said part of said flange to within 0.020 of an inch.

17. The method set forth in claim 11 including holding the true profile of said gear tooth profile surface to within 0.030 of an inch.

18. The method set forth in claim 12 including holding the true profile of said gear tooth profile surface to within 0.030 of an inch.

19. The method set forth in claim 13 including holding the true profile of said gear tooth profile surface to within 0.030 of an inch.

20. The method set forth in claim 14 including holding the true profile of said gear tooth profile surface to within 0.030 of an inch.

21. A two piece coin die assembly for the forging and finishing without machining of various surfaces of a toothed segment for an endless track wheel and wherein said surfaces are arranged generally at right angles to one another, and wherein said segment is arcuate in shape and has a radially inwardly extending, central mounting flange with opposite sides, and said segment also has an outer driving tooth portion extending laterally beyond either of said flange opposite sides, said portion having opposite sides and a gear tooth profile surface formed between its sides and at an angle of about 90 degrees with respect thereto, said surfaces to be finished including (1) at least a part of one side of said flange, (2) said opposite sides of said driving tooth portion, and (3) said gear tooth profile; said die assembly comprising;
a lower die and an upper die relatively movable in a direction toward and away from one another to thereby close and open said die assembly, said assembly when open adapted to supportingly receive said segment in said lower die, said lower die having supporting and finishing surfaces, one for each of one of said driving tooth portion sides and also for said gear tooth profile surface, said supporting and finishing surfaces being arranged at an inclined angle to said direction of die movement,
said upper die having a finishing surface engagable with the other of said driving tooth portion sides when said die is closed, said upper die also having an adjustable coin button rigidly secured therein for finishing engagement with one side of said flange to finish form part of said one side when said assembly is closed.

22. The die assembly set forth in claim 21 further characterized in that the diagonally opposite corners of the die assembly cavity both lie in a horizontal plane.

* * * * *